(12) United States Patent
Jacoby

(10) Patent No.: US 7,633,277 B1
(45) Date of Patent: Dec. 15, 2009

(54) SYSTEM AND METHOD FOR TESTING WORST CASE TRANSIENTS IN A SWITCHING-MODE POWER SUPPLY

(75) Inventor: Rambod Jacoby, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 399 days.

(21) Appl. No.: 11/749,098

(22) Filed: May 15, 2007

(51) Int. Cl.
G05F 1/59 (2006.01)
(52) U.S. Cl. ...................... 323/271; 323/282
(58) Field of Classification Search ........... 323/271, 323/282
See application file for complete search history.

(56) References Cited

U.S. PATENT DOCUMENTS

| | | | | |
|---|---|---|---|---|
| 5,744,944 A | * | 4/1998 | Danstrom | 323/284 |
| 5,987,615 A | * | 11/1999 | Danstrom | 713/300 |
| 6,509,712 B1 | * | 1/2003 | Landis | 320/101 |
| 6,809,504 B2 | * | 10/2004 | Tang et al. | 323/274 |
| 7,391,192 B2 | * | 6/2008 | Ostrom et al. | 323/274 |
| 7,443,148 B2 | * | 10/2008 | Weng | 323/271 |
| 2002/0125871 A1 | * | 9/2002 | Groom et al. | 323/284 |
| 2002/0125872 A1 | * | 9/2002 | Groom et al. | 323/288 |
| 2007/0096703 A1 | * | 5/2007 | Jain | 323/282 |
| 2007/0096704 A1 | * | 5/2007 | Jain et al. | 323/282 |
| 2009/0195231 A1 | * | 8/2009 | Noon et al. | 323/282 |

* cited by examiner

*Primary Examiner*—Jeffrey L Sterrett
(74) *Attorney, Agent, or Firm*—Patterson & Sheridan, LLP

(57) ABSTRACT

One embodiment of the present invention sets forth a system and a method for testing the worst-case transients in the output voltage produced by a switching-mode power supply (SMPS). The system includes an SMPS and a dynamic load generator (DLG). The SMPS converts the input voltage into the output voltage by using a top field-effect transistor (FET) and a bottom FET. The worst case transients occur when the load being provided to the SMPS is turned on or off at the same time the top FET is turned off. The DLG is configured to monitor the edge of the gate voltage of the top FET and to turn the load provided to the SMPS on or off when the edge of the gate voltage of the top FET is falling. Consequently, the disclosed system is able to test the worst-case transients in the output voltage produced by the SMPS in a manner that is more reliable than prior art approaches.

28 Claims, 4 Drawing Sheets

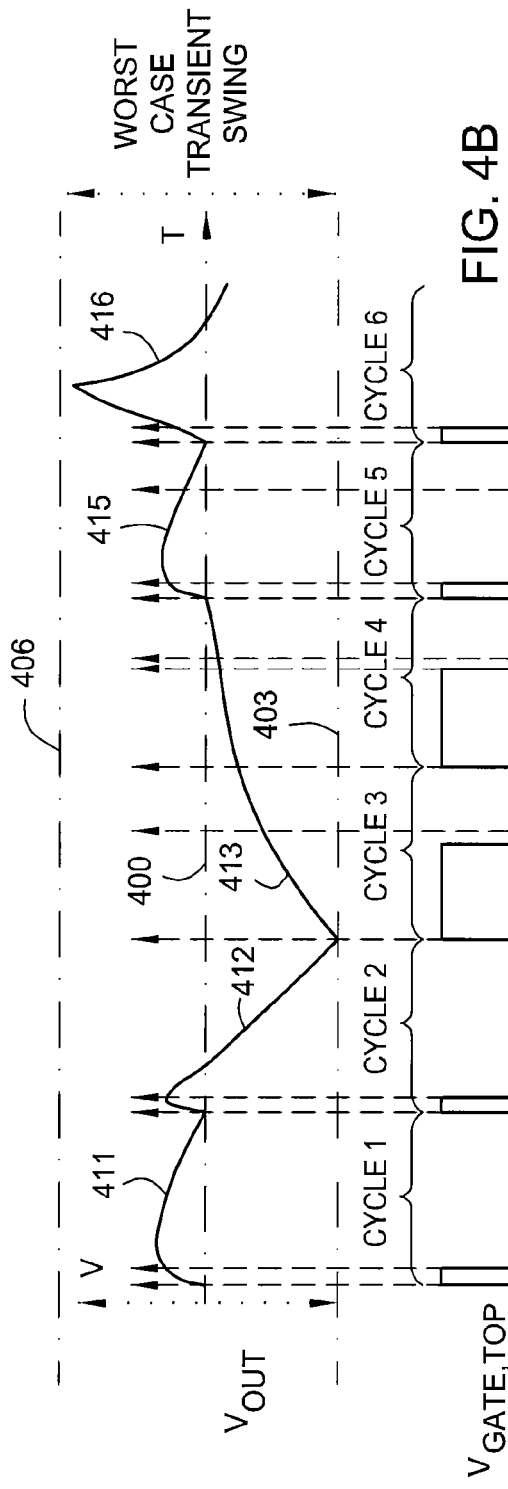
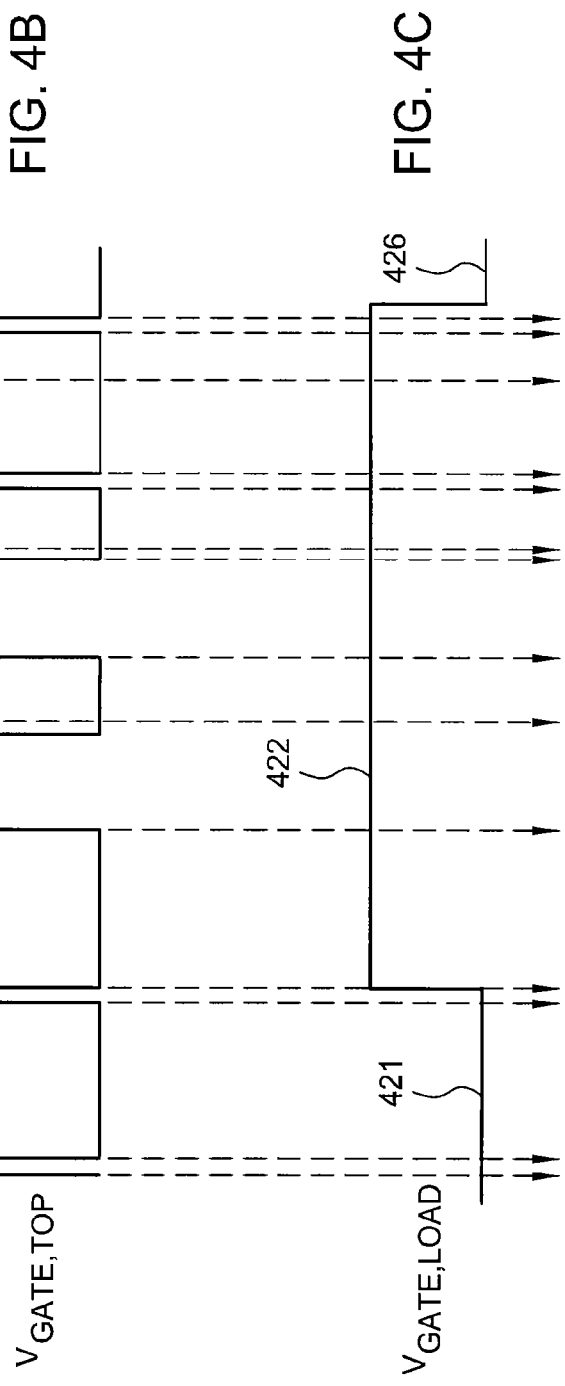
FIG. 4A
FIG. 4B
FIG. 4C

SYSTEM AND METHOD FOR TESTING WORST CASE TRANSIENTS IN A SWITCHING-MODE POWER SUPPLY

BACKGROUND OF THE INVENTION

1. Field of the Invention

Embodiments of the present invention generally relate to power converters and, more specifically, to systems and methods for testing worst case transients in a switching-mode power supply.

2. Description of the Related Art

Electric power is rarely used in electronic devices in the same form in which the power was originally produced or distributed. Therefore, a vast majority of electronic systems include some type of device that performs power conversions to convert power into a form that can be more readily used within those systems. One example of such a conversion device is a switching-mode power supply (SMPS). An SMPS incorporates a control circuit that switches transistors on and off in order to transfer electric energy from the source to the load through magnetic components and capacitors. A specific example of an SMPS is a switching DC-DC power supply that draws 100 Watts of power from a 48 Volt DC source and converts the 48 Volt DC input to a 3 Volt DC output, which can be used to drive a graphics card.

While in a steady-state, an SMPS provides a constant output voltage to a constant load. However, if the load suddenly changes (e.g., when a graphics card turns on or turns off), the output voltage may temporarily deviate from the constant value until the control circuit within the SMPS makes the adjustments necessary to return the output voltage to the desired constant value. Such temporary excursions from the desired output voltage are commonly referred to as "transients." As is well-known, large transients in the output voltage of an SMPS may negatively impact the load. Therefore, before incorporating an SMPS into an electronic system, the SMPS is tested to determine the range of potential output voltages (referred to herein as a "transient swing") that may be provided by the SMPS in response to varying loads. If the transient swing exceeds the limits that the load within the electronic system can withstand, then the power supply needs to be either modified appropriately or discarded.

A static load generator is oftentimes used to test a power supply to determine the range of output voltages the power supply will produce in the face of a varying load. For example, FIG. 1 illustrates a testing system 100 for testing the range of output voltages that a switching-mode power supply will produce in the face of a varying load, according to prior art. As shown, the testing system 100 includes a switching-mode power supply (SMPS) 110 connected to a static load generator (SLG) 160. The SMPS 110 includes a top field-effect transistor (FET) 112 and a bottom FET 114, controlled by a controller 120 though connections 122 and 124, respectively. The SLG 160 may be operated in two modes to provide a load for the SMPS 110. In one mode, the SLG 160 provides a constant load. In this case, by setting the duty cycle, frequency, and/or phase shift of the top FET 112 and the bottom FET 114, the controller 120 ensures that an input voltage (shown as "Vin"), is converted into the desired output voltage (shown as "Vout"). In the other mode, the SLG 160 provides varying loads and draws different amounts of power from the SMPS 110. The SLG 160 may be configured to change the loads either randomly or according to certain pre-programmed instructions. When the load provided by the SLG 160 changes, the output voltage provided by the SMPS 110 deviates from the desired value. In response to these changes in the output voltage, the controller 120 adjusts the duty cycle, frequency, and/or phase shift of the top FET 112 and the bottom FET 114 until the desired output voltage is once again established. Since such adjustments do not happen instantaneously, the transients above and below the desired output voltage can be detected and the range of potential output voltages produced by the SMPS 110 may be established.

One drawback to the above approach, however, is that the detected transients above or below the desired output voltage may not be the largest transients produced within the SMPS. The largest transients occur when the load provided to the power supply is either turned on or turned off at the same time the power supply controller turns off the top FET in the power supply. Such a state of the power supply is referred to herein as the "most vulnerable state," and the transients that occur when the power supply is in the most vulnerable state are referred to herein as "worst case transients." Thus, the occurrence of the worst case transients depends not only on the state of the load, but also on the state of the power supply. Since prior art static load generators, such as the SLG 160, do not take into consideration the state of the power supply, testing the worst case transients with a testing system such as the testing system 100 is ultimately unreliable.

As the foregoing illustrates, what is needed in the art is a technique for testing switching-mode power supplies that is capable of ensuring that the power supply output is tested when the worst case transients are present.

SUMMARY OF THE INVENTION

One embodiment of the present invention sets forth a method for testing worst-case transients associated with an output signal produced by a switching-mode power supply (SMPS). The method includes the steps of monitoring a turn-on parameter associated with a top transistor included within the SMPS to determine when the top transistor turns off and determining the state of a load being provided to the SMPS. The method also includes the steps of changing the state of the load when the turn-on parameter indicates that the top transistor has turned off, where the changed state of the load causes a value of the output signal to change from a steady-state value to a transient value, and maintaining the changed state of the load constant until the transient value of the output signal returns to the steady-state value.

One advantage of the disclosed method is that using a dynamic load generator that monitors a turn-on parameter associated with the top transistor included within the power supply, such as the rising/falling edge of the top gate voltage, allows the load being provided to the power supply to be turned on or off when the turn-on parameter indicates that the top transistor has turned off. In this fashion, the worst-case transient swing in the output voltage produced by the power supply can be adequately tested. As a result, the disclosed system and the method are able to test the worst-case transients in a manner that is more reliable and accurate than prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A through 4C are timing diagrams illustrating the operation of the testing system of FIG. 2, according to one embodiment of the present invention.

DETAILED DESCRIPTION

Figure 1:
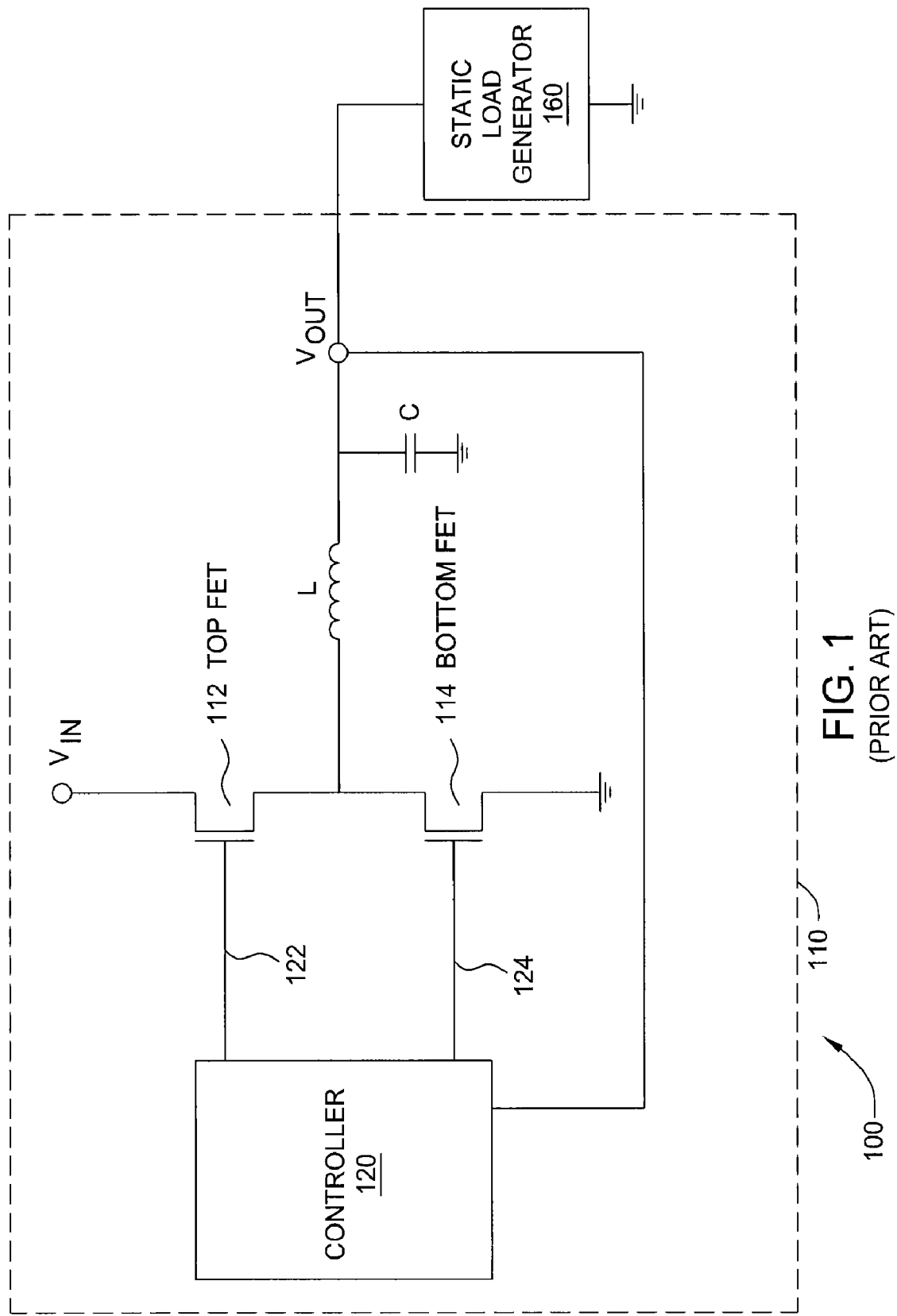
FIG. 1 illustrates a testing system for testing the range of output voltages that a switching-mode power supply will produce in the face of a varying load, according to prior art.
Figure 2:
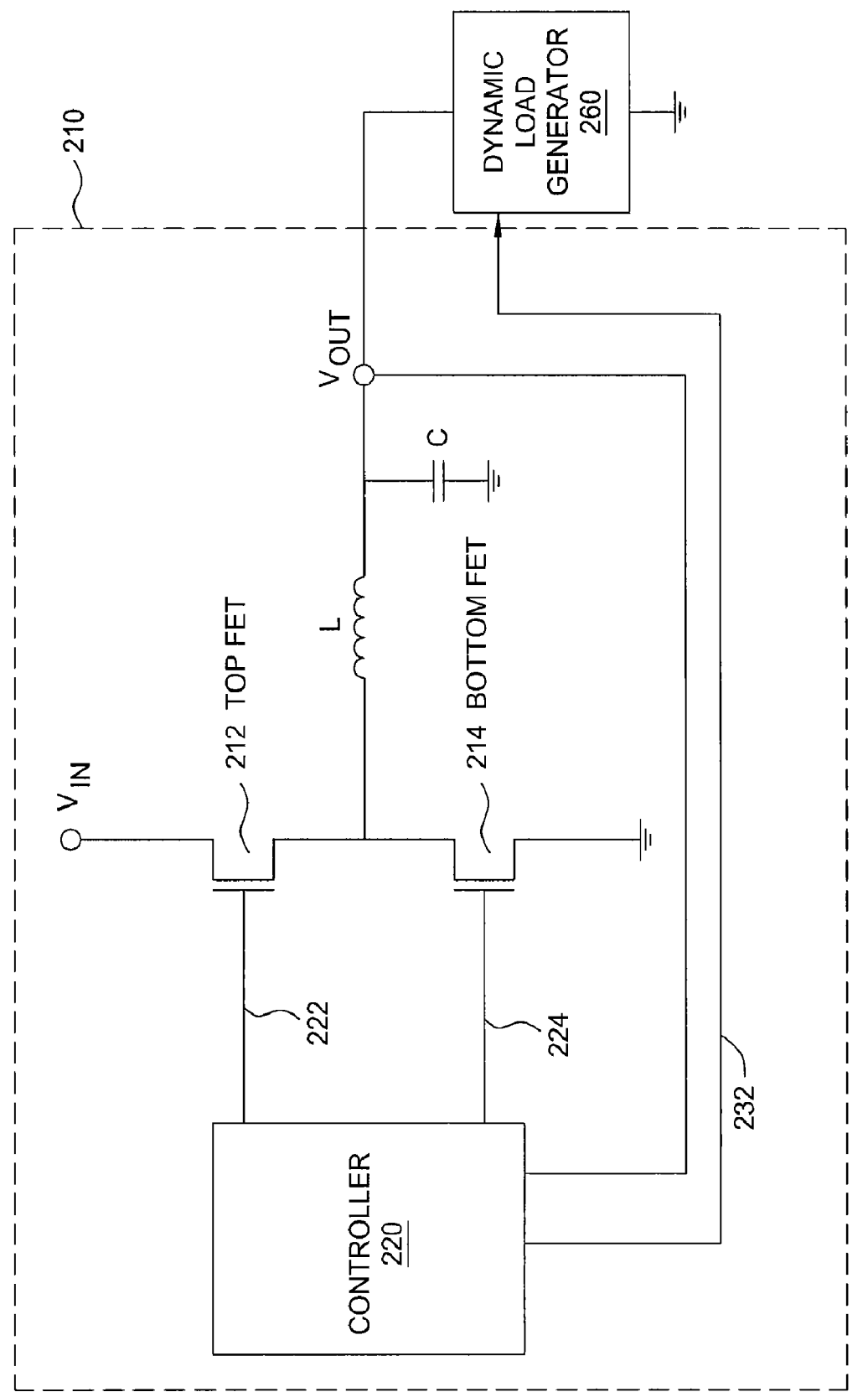
FIG. 2 illustrates a testing system for testing the worst case transients in output voltage that a switching-mode power supply will produce in the face of a varying load, according to one embodiment of the present invention.

FIG. 2 illustrates a testing system 200 for testing the worst-case transient in output voltage that a switching-mode power supply will produce in the face of a varying load, according to one embodiment of the present invention. As shown, the testing system 200 includes a switching-mode power supply 210 connected to a dynamic load generator (DLG) 260. The SMPS 210 includes a top FET 212 and a bottom FET 214. Similar to FIG. 1, the top FET 212 and the bottom FET 214 are controlled by a controller 220 through connections 222 and 224, respectively. When the DLG 260 provides a constant load to the SMPS 210, the controller 220 ensures that an input voltage (shown as "Vin"), is converted into the desired output voltage (shown as "Vout") by setting the duty cycle, frequency, and/or phase shift of the top FET 212 and the bottom FET 214 to appropriate values.

The controller 220 turns the top FET 212 and the bottom FET 214 on or off by turning their respective gate voltages on or off. The gate voltage of the top FET 212 is referred to herein as the "top gate voltage," and the gate voltage at the bottom FET 214 is referred to herein as the "bottom gate voltage." Importantly, in addition to controlling the top FET 212 and the bottom FET 214, the controller 220 is configured to continuously provide the values of the top gate voltage and the bottom gate voltage to the DLG 260 through a connection 232. In turn, the DLG 260 is configured to monitor the top gate voltage, which allows the DLG 260 to determine when the SMPS 210 is in the most vulnerable state. Furthermore, logic within the DLG 260 is configured to execute an algorithm, described below in FIG. 3, to turn the load on the SMPS 210 on and off at the times when the SMPS 210 is in the most vulnerable state. In this fashion, the DLG 260 ensures that the worst case transients are present within the SMPS 210 when the different output voltages produced by the SMPS 210 in the face of a varying load are measured.

Figure 3:
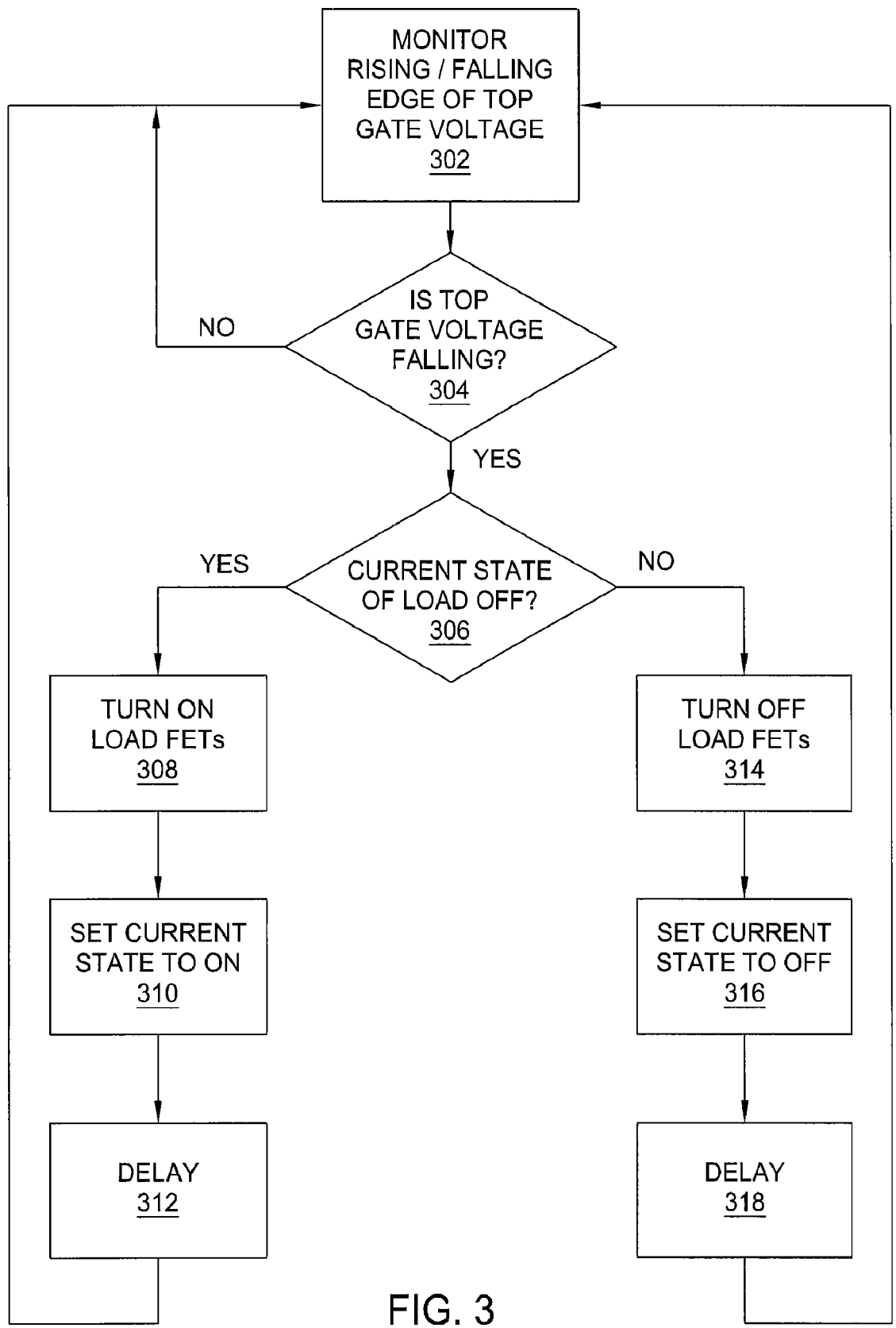
FIG. 3 sets forth a flow diagram of method steps for operating the dynamic load generator of FIG. 2 to test the worst-case transient swing produced by the SMPS of FIG. 2, according to one embodiment of the present invention.

FIG. 3 sets forth a flow diagram of method steps for operating the dynamic load generator 260 of FIG. 2 to test the worst-case transient swing produced by the SMPS 210 of FIG. 2, according to one embodiment of the present invention. Although the method steps are described in conjunction with the system of FIG. 2, persons skilled in the art will understand that any system that performs the method steps, in any order, is within the scope of the invention.

The method begins in step 302, where the DLG 260 monitors the rising/falling edge of the top gate voltage. In step 304, the DLG 260 determines whether the top gate voltage is falling, which indicates that the top FET 212 has turned off. If the top gate voltage is not falling (i.e., the top gate voltage is either rising or remaining constant), then the method returns to step 302. If, however, the DLG 260 determines that the top gate voltage is falling, then the method proceeds to step 306.

In step 306, the DLG 260 determines whether the load being provided to the SMPS 210 is off. The current state of the load depends on the state of the load FETs within the DLG 260 (not shown). If the load FETs are off, then the current state is said to be "off," and if the load FETs are on, then the current state is said to be "on." If the DLG 260 determines that the load FETs are off, then the method proceeds to step 308, where the DLG 260 turns the load FETs on. In step 310, the value of the current state of the load FETs is set to "on" within logic in the DLG 260 used to track the state of the load FETs. Since the load being provided to the SMPS 210 is turned on at the same time the top gate voltage is falling, the value of the output voltage produced by the SMPS 210 significantly decreases from the desired steady-state output voltage (such a decrease is referred to herein as a "drop"). The method then proceeds to step 312.

In step 312, the DLG 260 delays any further changes to the state of the load being provided to the SMPS 210 until the output voltage returns to the desired steady-state value. During the delay period, the controller 220 adjusts the parameters of the top FET 212 and the bottom FET 214 in order to achieve the desired output voltage. In one embodiment, the controller 220 may change, for example, the duty cycle of the top FET 212 and the bottom FET 214. Importantly, during the delay period in step 312, several instances of falling top gate voltages may be detected by the DLG 260, but the DLG 260 maintains the current state of the load being provided to the SMPS 210. Persons skilled in the art will appreciate that maintaining the state of the load until the desired steady-state output voltage is achieved allows the worst case transients to be tested. For example, if the state of the load is changed by turning off the load FETs before the output voltage has time to recover from the drop, then the transient increase in the output voltage associated with turning the load FETs off would not be as large as possible because the voltage output increase would start at a point that is below the desired output voltage. Once the output voltage of the SMPS 210 returns to the desired steady-state value, the method returns to step 302, described above.

Referring back now to step 306, if the DLG 260 determines that the load FETs are on, then the method proceeds to step 314, where the DLG 260 turns the load FETs off. In step 316, the value of the current state of the load FETs is set to "off." Since the load being provided to the SMPS 210 is turned off at the same time the top gate voltage is falling, the value of the output voltage produced by the SMPS 210 significantly increases from the desired steady-state output voltage (such an increase is referred to herein as a "overshoot").

In step 318, the DLG 260 delays any further changes to the state of the load being provided to the SMPS 210 until the output voltage returns to the desired steady-state value. Again, during the delay period, the controller 220 adjusts the parameters of the top FET 212 and the bottom FET 214 in order to achieve the desired output voltage. As described in step 312, during the delay period, several instances of falling top gate voltages may be detected by the DLG 260, but the DLG 260 maintains the current state of the load being provided to the SMPS 210. If the state of the load is changed by turning on the load FETS before the output voltage has time to recover from the overshoot, then the transient drop in the output voltage associated with turning the load FETs on would not be as large as possible because the voltage output decrease would start at a point that is above the desired output voltage. Once the output voltage of the SMPS 210 returns to the desired steady-state value, the method returns to step 302, described above.

FIGS. 4A through 4C are timing diagrams illustrating the operation of the testing system of FIG. 2, according to one embodiment of the present invention. The x-axis of all three figures shows the time, t. The y-axis of FIG. 4A shows the output voltage, and a line 400 in FIG. 4A indicates the value of the desired output voltage. The y-axis of FIG. 4B shows the top gate voltage (i.e., the voltage of the top FET 212). The y-axis of FIG. 4C shows the gate voltage of load FETs (i.e., representing the load being provided to the SMPS 210). Cycles 1 through 6 shown in FIG. 4B illustrate the on/off times of the top FET 212. Finally, the output voltage illustrated on FIG. 4A is the output voltage produced by the SMPS 210 as a result of operating the DLG 260 as described in FIG. 3 and illustrated in FIG. 4C.

As shown in FIG. 4C, in cycle 1, the load FETs are off. The slight ripple in the output voltage, shown as a line 411 in FIG. 4A, is an expected ripple voltage associated with the top FET 212 being periodically turned on and off by the controller 220. The ripple voltage is typically well within the tolerance limits of most electronic systems.

In cycle 2, the DLG 260 detects when the top gate voltage is falling. As previously described, a falling top gate voltage is the condition needed to place the SMPS 210 in the most vulnerable state because the falling top gate voltage indicates that the top FET 212 has turned off. Therefore, upon detecting the falling top gate voltage, the DLG 260 turns the load FETs on, as shown in cycle 2 of FIG. 4C. As described in step 308 of FIG. 3, turning the load FETs on at the time when the top gate voltage is falling causes a noticeable drop in the output voltage, as shown by a line 412 in FIG. 4A. Consequently, in cycles 3 and 4 of FIG. 4B, the controller 220 is changing the on/off times of the top FET 212 in order to compensate for the output voltage drop and to bring the output voltage of the SMPS 210 back to the desired steady-state value. As previously described in step 312 of FIG. 3 and shown in cycles 3, 4, and 5 of FIG. 4C, the DLG 260 delays any further changes to the state of the load FETs until the output voltage returns to the desired steady-state value. As shown by a line 413, the output voltage of the SMPS 210 reaches the desired steady-state value at cycle 5. Therefore, the on/off times of the top gate voltage in cycle 5 are similar to the on/off times in cycle 1.

In cycle 6, the DLG 260 detects that the top gate voltage is once again falling, indicating that the top FET 212 has turned off and the SMPS 210 is, again, in the most vulnerable state. Therefore, at that time, the DLG 260 turns the load FETs off, as shown in cycle 6 of FIG. 4C. As described in step 314 of FIG. 3, turning the load FETs off at the time when the top gate voltage is falling causes a noticeable overshoot in the output voltage, as shown by a line 416 in FIG. 4A. The lines 403 and 406 drawn from the lowest drop in the output voltage in cycle 2 and the greatest overshoot in the output voltage in cycle 6, respectively, show the magnitude of the worst-case transient swing in the output voltage produced by the SMPS 210. As previously described herein, if the worst-case transient swing exceeds the limits that a load (such as a graphics card) provided to the SMPS 210 can withstand, then the SMPS 210 needs to be modified appropriately or discarded.

Persons skilled in the art will recognize that, in various embodiments, the SMPS may be not a switching mode DC-DC power supply illustrated in the embodiments of the present invention, but a switching mode DC-AC, switching mode AC-AC, or a switching mode AC-DC power supply. In addition, in alternative embodiments, the turn-on parameter indicating when the top FET has turned off may be an edge of a drain voltage of the top FET, an edge of a source voltage of the top FET, an edge of a gate voltage of the bottom FET, an edge of a drain voltage of the bottom FET, or an edge of a source voltage of the bottom FET. Furthermore, the turn-on parameter may be a voltage across an inductor included within the SMPS or the output signal of the SMPS, which produces a ripple when the top FET turns on or off. Furthermore, in various embodiments, the top and bottom transistors within the SMPS may be not FETS, but may be any type of transistors (e.g., bipolar junction transistors). In such embodiments, the turn-on parameter indicating that the transistors are being turned on or off may be any turn-on parameters associated with the particular type of transistor being used within the power supply, as opposed to top and bottom gate, drain, or source voltages, which are the turn-on parameters associated with FETs.

One advantage of the disclosed system and method is that using a dynamic load generator that monitors a turn-on parameter associated with the top transistor included within the power supply, such as the rising/falling of the top gate voltage, allows the load being provided to the power supply to be turned on or off when the turn-on parameter indicates that the top transistor has turned off. In this fashion, the worst-case transient swing in the output voltage produced by the power supply can be adequately tested. As a result, the disclosed system and the method are able to test the worst-case transients in a manner that is more reliable and accurate than prior art approaches.

While the foregoing is directed to embodiments of the present invention, other and further embodiments of the invention may be devised without departing from the basic scope thereof, and the scope thereof is determined by the claims that follow.

I claim:

1. A method for testing worst case transients associated with an output signal produced by a switching-mode power supply (SMPS), the method comprising:
   monitoring a turn-on parameter associated with a top transistor included within the SMPS to determine when the top transistor turns off;
   determining the state of a load being provided to the SMPS;
   changing the state of the load when the turn-on parameter indicates that the top transistor has turned off, wherein the changed state of the load causes a value of the output signal to change from a steady-state value to a transient value; and
   maintaining the changed state of the load constant until the transient value of the output signal returns to the steady-state value.

2. The method of claim 1, wherein the SMPS comprises a switching-mode DC-DC voltage power supply, and the output signal is an output voltage signal.

3. The method of claim 2, wherein the turn-on parameter is the output voltage signal, which produces a ripple when the top transistor has turned off.

4. The method of claim 1, wherein the top transistor comprises a field-effect transistor (FET).

5. The method of claim 4, wherein the turn-on parameter is an edge of a drain voltage of the top FET or an edge of a source voltage of the top FET.

6. The method of claim 4, wherein the turn-on parameter is an edge of a gate voltage of the top FET.

7. The method of claim 1, wherein the turn-on parameter is an edge of a voltage across an inductor included within the SMPS.

8. The method of claim 1, wherein the turn-on parameter is an edge of a gate voltage of a bottom transistor also included within the SMPS, an edge of a drain voltage of the bottom transistor, or an edge of a source voltage of the bottom transistor.

9. The method of claim 1, wherein the state of the load is an off state, and the step of changing the state of the load includes turning on the load.

10. The method of claim 9, wherein turning on the load includes turning on one or more load field-effect transistors (FETs).

11. The method of claim 9, wherein turning on the load causes the value of the output signal to drop below the steady-state value.

12. The method of claim 1, wherein the state of the load is an on state, and the step of changing the state of the load includes turning off the load.

13. The method of claim 12, wherein turning the load off further includes turning off one or more load field-effect transistors (FETs).

14. The method of claim 12, wherein turning off the load causes the value of the output signal to overshoot the steady-state value.

15. A testing system, comprising:
a switching-mode power supply (SMPS) configured to produce an output signal and including a top transistor, a bottom transistor, and a controller configured to control the top transistor and the bottom transistor to achieve a steady-state output signal value; and
a dynamic load generator (DLG) that provides a load to the SMPS and is configured to:
monitor a turn-on parameter associated with the top transistor to determine when the top transistor turns off;
determine the state of a load being provided to the SMPS;
change the state of the load when the turn-on parameter indicates that the top transistor has turned off, wherein the changed state of the load causes a value of the output signal to change from a steady-state value to a transient value; and
maintain the changed state of the load constant until the transient value of the output signal returns to the steady-state value.

16. The system of claim 15, wherein the SMPS comprises a switching-mode DC-DC voltage power supply, and the output signal is an output voltage signal.

17. The system of claim 16, wherein the turn-on parameter is the output voltage signal, which produces a ripple when the top transistor has turned off.

18. The system of claim 15, wherein the top transistor comprises a field-effect transistor (FET).

19. The system of claim 18, wherein the turn-on parameter is an edge of a drain voltage of the top FET or an edge of a source voltage of the top FET.

20. The system of claim 18, wherein the turn-on parameter is an edge of a gate voltage of the top FET.

21. The system of claim 15, wherein the turn-on parameter is an edge of a voltage across an inductor also included within the SMPS.

22. The system of claim 15, wherein the turn-on parameter is an edge of a gate voltage of the bottom transistor included within the SMPS, an edge of a drain voltage of the bottom transistor, or an edge of a source voltage of the bottom transistor.

23. The system of claim 15, wherein the state of the load is an off state, and the step of changing the state of the load includes turning on the load.

24. The system of claim 23, wherein turning on the load includes turning on one or more load field-effect transistors (FETs).

25. The system of claim 23, wherein turning on the load causes the value of the output signal to drop below the steady-state value.

26. The system of claim 15, wherein the state of the load is an on state, and the step of changing the state of the load includes turning off the load.

27. The system of claim 26, wherein turning the load off further includes turning off one or more load field-effect transistors (FETs).

28. The system of claim 26, wherein turning off the load causes the value of the output signal to overshoot the steady-state value.

* * * * *